US012432768B2

(12) United States Patent
Zhai et al.

(10) Patent No.: US 12,432,768 B2
(45) Date of Patent: Sep. 30, 2025

(54) METHOD AND DEVICE FOR STOPPING SENDING SCHEDULE REQUEST

(71) Applicant: DATANG MOBILE COMMUNICATIONS EQUIPMENT CO., LTD., Beijing (CN)

(72) Inventors: Haitao Zhai, Beijing (CN); Yali Zhao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 429 days.

(21) Appl. No.: 17/915,099

(22) PCT Filed: Apr. 2, 2021

(86) PCT No.: PCT/CN2021/085205
§ 371 (c)(1),
(2) Date: Sep. 28, 2022

(87) PCT Pub. No.: WO2021/204073
PCT Pub. Date: Oct. 14, 2021

(65) Prior Publication Data
US 2023/0156768 A1 May 18, 2023

(30) Foreign Application Priority Data
Apr. 8, 2020 (CN) .......................... 202010268262.1

(51) Int. Cl.
*H04W 72/543* (2023.01)
*H04W 72/21* (2023.01)
(Continued)

(52) U.S. Cl.
CPC ......... *H04W 72/543* (2023.01); *H04W 72/21* (2023.01); *H04W 72/25* (2023.01); *H04W 76/15* (2018.02)

(58) Field of Classification Search
CPC ... H04W 72/543; H04W 72/21; H04W 72/25; H04W 76/15; H04W 4/40; H04W 72/40;
(Continued)

(56) References Cited

U.S. PATENT DOCUMENTS

| 2012/0089797 A1 | 4/2012 | Shibayama et al. |
| 2019/0182896 A1 | 6/2019 | Shrestha et al. |
| 2022/0201731 A1* | 6/2022 | Lee ........................ H04W 72/20 |

FOREIGN PATENT DOCUMENTS

| CN | 107466487 A | 12/2017 |
| CN | 108366430 A | 8/2018 |

(Continued)

OTHER PUBLICATIONS

Huawei et al., "SR triggering and cancellation", 3GPP TSG-RAN WG2 #98, Hangzhou, China, May 15-19, 2017, total 3 pages, R2-1705198.

(Continued)

*Primary Examiner* — Thai Nguyen
(74) *Attorney, Agent, or Firm* — KILPATRICK TOWNSEND & STOCKTON LLP

(57) ABSTRACT

Disclosed are a method and device for stopping sending a schedule request. The method includes: in response to a demand for requesting from a network side resource scheduling for information of a specific target, determining a delay requirement of the specific target; and before an SR is sent to the network side, if it is determined that the delay requirement of the specific target cannot be met, stopping sending the SR.

16 Claims, 10 Drawing Sheets

(51) Int. Cl.
*H04W 72/25* (2023.01)
*H04W 76/15* (2018.01)

(58) Field of Classification Search
CPC ......... H04W 4/44; H04W 72/12; H04W 4/46; H04W 72/1268; H04W 72/23
See application file for complete search history.

(56) References Cited

FOREIGN PATENT DOCUMENTS

| | | |
|---|---|---|
| CN | 109152025 A | 1/2019 |
| CN | 109392175 A | 2/2019 |
| CN | 109587796 A | 4/2019 |
| CN | 110521268 A | 11/2019 |
| CN | 110831207 A | 2/2020 |
| EP | 3627933 A1 | 3/2020 |
| WO | 2015027455 A1 | 3/2015 |
| WO | 2018201929 A1 | 11/2018 |
| WO | WO-2021203390 A1 * 10/2021 ........ H04W 72/1263 |

OTHER PUBLICATIONS

ZTE,"Report of [AT109bis-e][302][NBIOT]Trigger for dedicated SR with HARQ-ACK (ZTE)", 3GPP TSG-RAN WG2 Meeting #109bis electronic, Ap. 20-Apr. 30, 2020, total 11 pages, R2-2004037.

* cited by examiner

METHOD AND DEVICE FOR STOPPING SENDING SCHEDULE REQUEST

CROSS REFERENCE TO RELATED APPLICATIONS

This application is a US National Stage of International Application No. PCT/CN2021/085205, filed on Apr. 2, 2021, which claims priority to Chinese Patent Application No. 202010268262.1 entitled "METHOD AND DEVICE FOR STOPPING SENDING SCHEDULE REQUEST" filed on Apr. 8, 2020 to the Chinese Patent Office, which is hereby incorporated herein by reference in its entirety.

FIELD

The present application relates to the field of communications, and in particular to a method and device for stopping sending a schedule request.

BACKGROUND

The vehicle-to-vehicle communication, vehicle-to-base station communication, and base station-to-base station communication are realized by using V2X (vehicle to everything) technology. For the vehicle-to-vehicle communication, a vehicle A needs to carry control information of a specific target to corresponding resources and send it to a vehicle B according to schedule resource information for data transmission sent by the base station. If there are no available resources at present, the vehicle A may send a schedule request (SR) to the base station to obtain the new schedule resource information sent by the base station; then, according to the new schedule resource information, the control information is carried on new resources and sent to the vehicle B.

Before sending the SR to the base station, it is also necessary to wait for the resources used for sending the SR, and if the waiting time is too long, the time when the vehicle A acquires new schedule resource information sent by the base station has exceeded the delay requirement of the specific target. However, at present, the vehicle A may stop sending the SR only if any one of the following conditions is met: the control information is carried on other resources by the vehicle A, and then is sent to vehicle B; or the vehicle A replaces the resource selection way.

In view of this, it is necessary to devise a new method for stopping sending a schedule request to overcome the above-mentioned drawbacks.

SUMMARY

Embodiments of the present disclosure provide a method and device for stopping sending a schedule request to solve the problem of acquisition timeout of schedule resource information sent by a network side.

Embodiments herein are as follows.

Some embodiments of the application provide a method for stopping sending a schedule request, including: in response to a demand for requesting from a network side resource scheduling for information of a specific target, determining a delay requirement of the specific target; and before an SR is sent to the network side, when it is determined that the delay requirement of the specific target is not met, stopping sending the SR.

In one embodiment, the determining the delay requirement of the specific target includes: when the specific target is a logical channel, determining a delay requirement from a Quality of Service (QoS) parameter corresponding to the logical channel; or, when the specific target is a Media Access Control Control Element (MAC CE), determining a delay requirement of the MAC CE.

In one embodiment, the determining the delay requirement of the MAC CE via protocol or network side configuration.

In one embodiment, whether the delay requirement of the specific target is met is determined by: determining, based on a set time offset, whether the delay requirement of the specific target is met; where the time offset is a duration from sending the SR to determining a Sidelink (SL) resource allocated by a network side.

In one embodiment, the method further includes: determining the time offset via protocol or network side configuration.

In one embodiment, the determining, based on the set time offset, whether the delay requirement of the specific target is met includes: determining that the delay requirement of the specific target is not met in response to the SR being not sent when a remaining duration of a timer is equal to the time offset; where the duration of the timer is set according to the delay requirement, and a starting time of the timer is the time when it is determined that resource scheduling for the information of the specific target needs to be requested from the network side.

In one embodiment, the determining, based on the set time offset, whether the delay requirement of the specific target is met includes: determining that the delay requirement of the specific target is not met in response to the SR being not sent when a duration of a time counter is equal to a time difference between the delay requirement of the specific target and the time offset.

In one embodiment, the determining, based on the set time offset, whether the delay requirement of the specific target is met includes: determining that the delay requirement of the specific target is not met in response to the SR being not sent when it is determined that a time difference between, a current time when resource scheduling for the information of the specific target is requested from the network side and a trigger time when resource scheduling for the information of the specific target is requested from the network side, is greater than the time difference between the delay requirement of the specific target and the time offset.

In one embodiment, whether the delay requirement of the specific target is met is determined by: determining that the delay requirement of the specific target is not met in response to the SR being not sent when it is determined that a time difference, between a current time when resource scheduling for the information of the specific target is requested from the network side and a trigger time when resource scheduling for the information of the specific target is requested from the network side, is greater than the delay requirement of the specific target.

In one embodiment, after determining that the delay requirement of the specific target is not met, and before stopping sending the SR, the method further includes: randomly requesting resource scheduling for the information of the specific target from the network side.

Some embodiments of the application further provide a user terminal, including: a memory, configured to store program instructions; and a processor, configured to call the program instructions stored in the memory, and execute according to an obtained program: in response to a demand for requesting from a network side resource scheduling for information of a specific target, determining a delay requirement of the specific target; and before an SR is sent to the network side, when it is determined that the delay requirement of the specific target is not met, stopping sending the SR.

In one embodiment, the processor is configured to execute: when the specific target is a logical channel, determining a delay requirement from a QoS parameter corresponding to the logical channel; or, when the specific target is an MAC CE, determining a delay requirement of the MAC CE.

In one embodiment, the processor is configured to determine the delay requirement of the MAC CE via protocol or network side configuration.

In one embodiment, the processor is configured to determine whether the delay requirement of the specific target is met by: determining, based on a set time offset, whether the delay requirement of the specific target is met; where the time offset is a duration from sending the SR to determining an SL resource allocated by a network side.

In one embodiment, the processor is further configured to: determine the time offset via protocol or network side configuration.

In one embodiment, the processor is configured to: determine that the delay requirement of the specific target is not met in response to the SR being not sent when a remaining duration of a timer is equal to the time offset; where the duration of the timer is set according to the delay requirement, and a starting time of the timer is the time when it is determined that resource scheduling for the information of the specific target needs to be requested from the network side.

In one embodiment, the processor is configured to: determine that the delay requirement of the specific target is not met in response to the SR being not sent when a duration of a time counter is equal to a time difference between the delay requirement of the specific target and the time offset.

In one embodiment, the processor is configured to: determine that the delay requirement of the specific target is not met in response to the SR being not sent when it is determined that a time difference, between a current time when resource scheduling for the information of the specific target is requested from the network side and a trigger time when resource scheduling for the information of the specific target is requested from the network side, is greater than the time difference between the delay requirement of the specific target and the time offset.

In one embodiment, the processor is configured to: determine that the delay requirement of the specific target is not met in response to the SR being not sent when it is determined that a time difference, between a current time when resource scheduling for the information of the specific target is requested from the network side and a trigger time when resource scheduling for the information of the specific target is requested from the network side, is greater than the delay requirement of the specific target.

In one embodiment, after determining that the delay requirement of the specific target is not met, and before stopping sending the SR, the processor is further configured to: randomly request resource scheduling for the information of the specific target from the network side.

Some embodiments of the application further disclose a device for stopping sending a schedule request, including: a determining device, configured to determine a delay requirement of the specific target, in response to a demand for requesting from a network side resource scheduling for information of a specific target; and a sending stop device, configured to stop sending the SR, when it is determined that the delay requirement of the specific target is not met before the SR is sent to the network side.

In one embodiment, the determining device is configured to: when the specific target is a logical channel, determine a delay requirement from a QoS parameter corresponding to the logical channel; or, when the specific target is an MAC CE, determine a delay requirement of the MAC CE.

In one embodiment, the determining device is configured to determine the delay requirement of the MAC CE via protocol or network side configuration.

In one embodiment, the sending stop device is configured to: determine, based on a set time offset, whether the delay requirement of the specific target is met; where the time offset is a duration from sending the SR to determining an SL resource allocated by a network side.

In one embodiment, the sending stop device is further configured to: determine the time offset via protocol or network side configuration.

In one embodiment, the sending stop device is configured to: determine that the delay requirement of the specific target is not met in response to the SR being not sent when a remaining duration of a timer is equal to the time offset; where the duration of the timer is set according to the delay requirement, and a starting time of the timer is the time when it is determined that resource scheduling for the information of the specific target needs to be requested from the network side.

In one embodiment, the sending stop device is configured to: determine that the delay requirement of the specific target is not met in response to the SR being not sent when a duration of a time counter is equal to a time difference between the delay requirement of the specific target and the time offset.

In one embodiment, the sending stop device is configured to: determine that the delay requirement of the specific target is not met in response to the SR being not sent when it is determined that a time difference, between a current time when resource scheduling for the information of the specific target is requested from the network side and a trigger time when resource scheduling for the information of the specific target is requested from the network side, is greater than the time difference between the delay requirement of the specific target and the time offset.

In one embodiment, the sending stop device is configured to: determine that the delay requirement of the specific target is not met in response to the SR being not sent when it is determined that a time difference, between a current time when resource scheduling for the information of the specific target is requested from the network side and a trigger time when resource scheduling for the information of the specific target is requested from the network side, is greater than the delay requirement of the specific target.

In one embodiment, after determining that the delay requirement of the specific target is not met, and before stopping sending the SR, the sending stop device is further configured to: randomly request resource scheduling for the information of the specific target from the network side.

Some embodiments of the application further provide a storage medium, including computer readable instructions which, when read and executed by a computer, cause the computer to perform the any method for stopping sending the schedule request.

The benefits of the present application are as follows: in the embodiments of the present application, in response to a demand for requesting from a network side resource scheduling for information of a specific target, a delay requirement of the specific target is determined; and before an SR is sent to the network side, when it is determined that the delay requirement of the specific target is not met, SR sending is stopped. In this way, before an SR is sent to a network side, when it is determined that a delay requirement of a specific target cannot be met, the sending of the SR is stopped in advance, and the acquisition timeout of schedule resource information sent by the network side can be avoided.

BRIEF DESCRIPTION OF THE DRAWINGS

The drawings illustrated herein serve to provide a further understanding of and constitute a part of this application, and the illustrative embodiments of this application and the description thereof are used to explain the present application and do not constitute an improper limitation of the present application.

DETAILED DESCRIPTION OF THE EMBODIMENTS

The embodiments of the present application clearer are described in the accompanying drawings of the embodiments of the present application, and it will be apparent that the embodiments described are some, but not all, embodiments of the solutions of the present application.

In order to solve the problem of acquisition timeout of schedule resource information sent by the network side, in the embodiments of the present application, a new solution is proposed to stop sending a schedule request. The solution includes in response to a demand for requesting from a network side resource scheduling for information of a specific target, determining a delay requirement of the specific target; and before an SR is sent to the network side, when it is determined that the delay requirement of the specific target is not met, stopping sending the SR.

The embodiments of the present application will be described in detail below with reference to the accompanying drawings.

Figure 1:
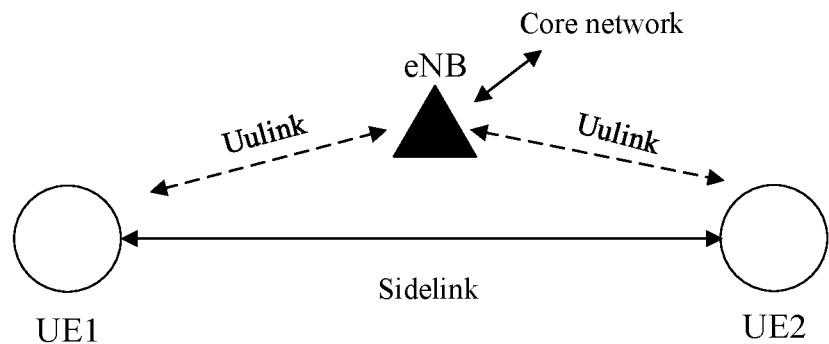
FIG. 1 shows a schematic architecture of a V2V communication system according to an embodiment of the present disclosure.

Referring to FIG. 1, FIG. 1 shows an architecture diagram of a Vehicle-to-Vehicle (V2V) communication system including a vehicle A (subsequently referred to as User Equipment (UE) 1), a vehicle B (subsequently referred to as UE2) and a base station (eNodeB, eNB) connected to one another. The UE1 and the UE2 perform data transmission through sidelink (SL), and the UE1 and the UE2 may establish a communication connection with the eNB through a cellular communication link (Uulink), respectively.

When the UE1 transmits data to the UE2, control information for a specific target needs to be carried onto the corresponding resources and then sent to the other according to the schedule resource information sent by the eNB for the data transmission. If there are no resources currently available, the UE1 needs to generate an SR by specific target triggering and then the SR is sent to the eNB to obtain the new schedule resource information sent by the eNB, but if the waiting time for resources to carry the scheduling resource request is too long, the time when UE1 obtains the new schedule resource information sent by the eNB has exceeded the delay requirement of the specific target. Therefore, before sending the SR to the eNB, the UE1 needs to determine whether to stop sending the SR in time according to the delay requirement of the specific target.

Figure 2:
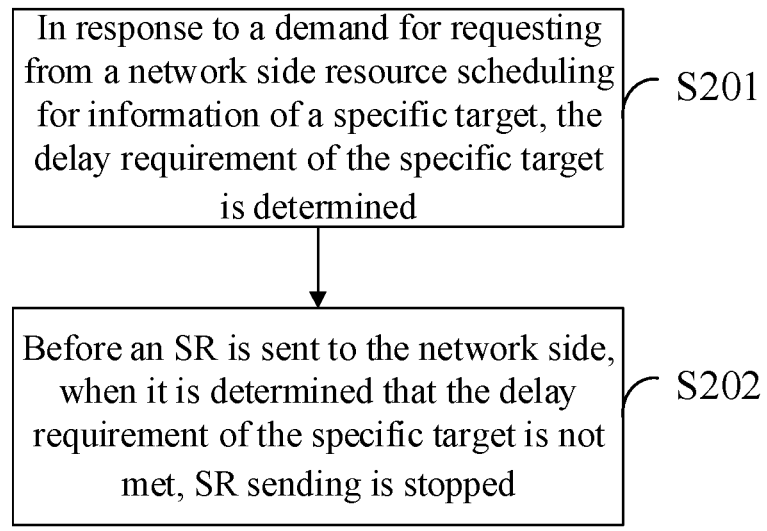
FIG. 2 shows a flowchart illustrating stopping sending an SR according to an embodiment of the present disclosure.

Referring to FIG. 2 which is a flowchart illustrating stopping sending an SR according to an embodiment of the present disclosure.

S201: in response to a demand for requesting from a network side resource scheduling for information of a specific target, the delay requirement of the specific target is determined.

In one embodiment, the determining the delay requirement of a specific target is: when the specific target is a logical channel, determining a delay requirement from a Quality of Service (QoS) parameter corresponding to the logical channel; or, when the specific target is a Media Access Control Control Element (MAC CE), determining a delay requirement of the MAC CE. The embodiment of the present application determines the delay requirement of the MAC CE via protocol or network side configuration.

S202: before an SR is sent to the network side, when it is determined that the delay requirement of the specific target is not met, SR sending is stopped.

In one embodiment, the embodiments of the present application provide the following two determining rules.

First rule: whether the delay requirement of the specific target is met is determined based on a set time offset. The time offset is the duration from sending the SR to determining an SL resource allocated by a network side, and the time offset is determined via the protocol or the network side configuration in the embodiments of the present disclosure.

The following three determining manners are included in the first determining rule.

Manner A: if the SR is not sent when the remaining duration of the timer is equal to the time offset, then it is determined that the delay requirement of the specific target is not met.

The duration of the timer is set according to the delay requirement and the starting time of the timer is the time when it is determined that resource scheduling for the information of the specific target needs to be requested from the network side.

The delay requirement of the specific target indicates the maximum duration for the UE1 to acquire the schedule resource information, and the time offset indicates the duration from sending the SR to determining an SL resource allocated by a network side. The duration of the timer is a duration during which the timer counts down from the delay requirement of the specific target, so when the remaining duration of the timer is equal to the time offset, the SR is still not sent, which means that when the SR is then sent to the network side, there may be a case where the duration of receiving the SL resource allocated by the network side has exceeded the delay requirement of the specific target.

Figure 3A:
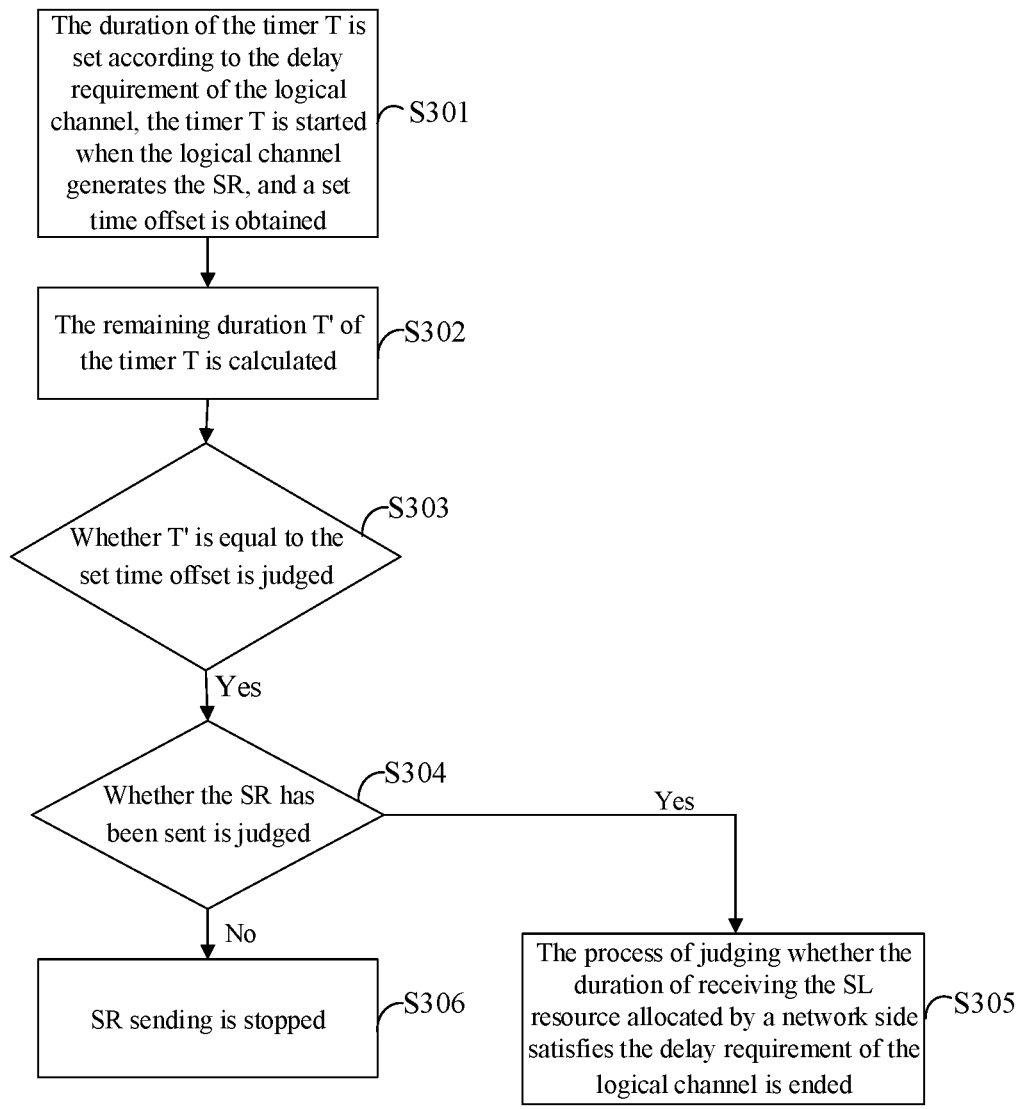
FIG. 3A shows a flowchart illustrating determining to stop sending an SR based on a remaining duration of a timer when a specific target is a logical channel according to an embodiment of the present disclosure.
Figure 3B:
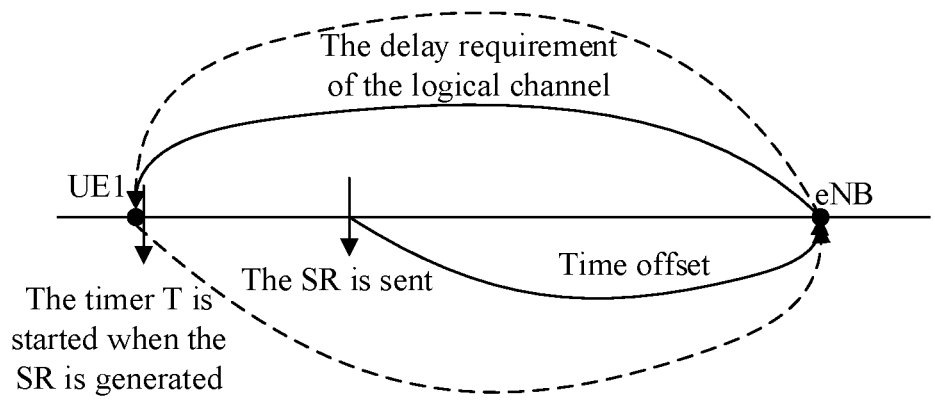
FIG. 3B shows a timeline illustrating stopping sending an SR generated by a logical channel according to an embodiment of the present disclosure.

In particular, when the specific target is a logical channel, reference is made to the flowchart diagram of FIG. 3A and the timeline diagram of FIG. 3B for illustration.

S301: the duration of the timer T is set according to the delay requirement of the logical channel, the timer T is started when the logical channel generates the SR, and a set time offset (denoted as delta T) is obtained.

S302: the remaining duration T' of the timer T is calculated.

S303: whether T' is equal to delta T is determined, and if yes, step 304 is performed.

S304: whether the SR has been sent is determined, and, if yes, step 305 is performed; otherwise, step 306 is performed.

S305: the process of determining whether the duration of receiving the SL resource allocated by a network side satisfies the delay requirement of the logical channel is ended.

S306: SR sending is stopped.

The delay requirement of the logical channel in FIG. 3B indicates the maximum duration for the UE1 to acquire the schedule resource information, the time offset delta T indicates the duration from sending the SR to determining the SL resource allocated by the network side, and the timer is started when the SR is generated.

Figure 4A:
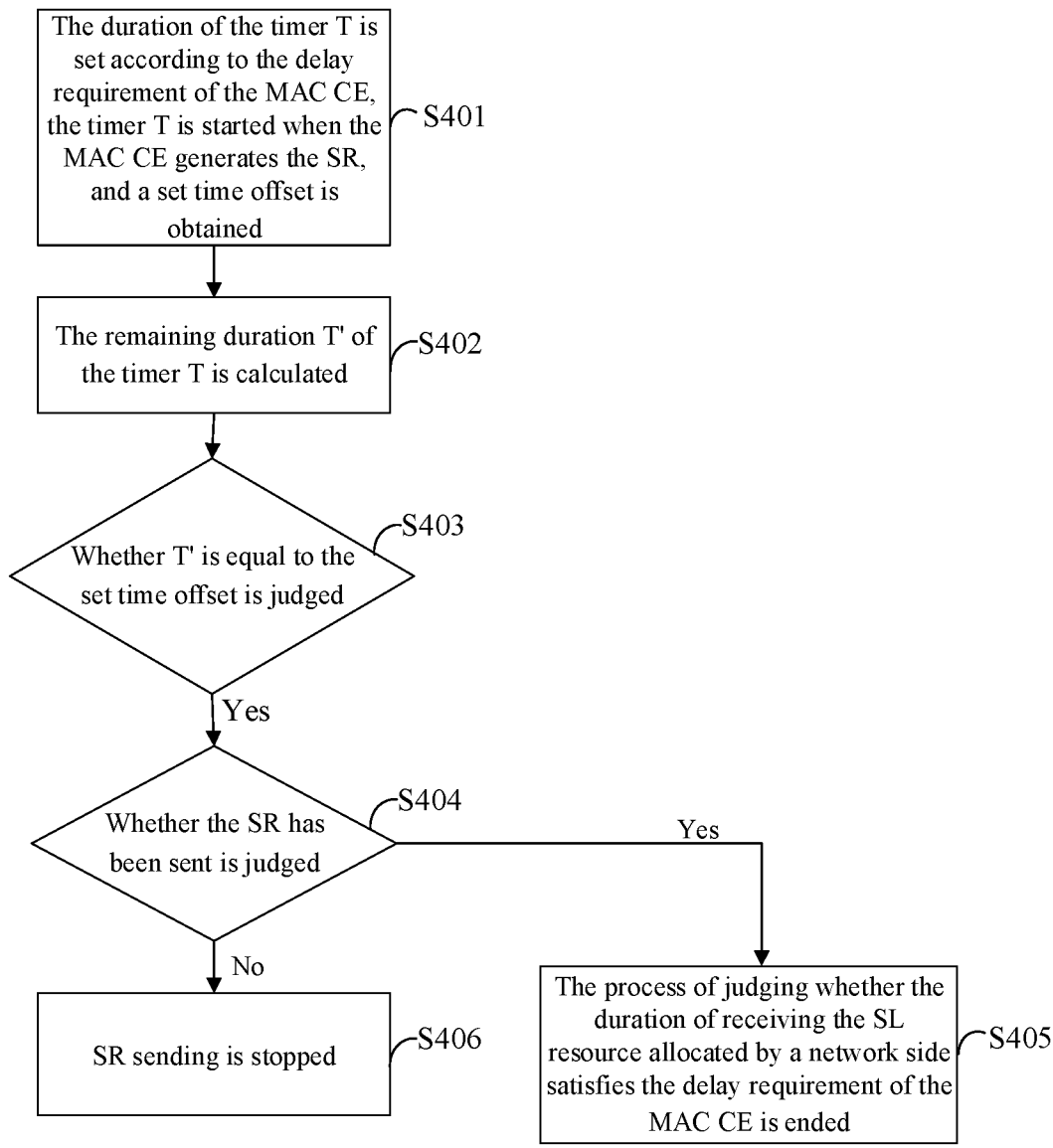
FIG. 4A shows a flowchart illustrating determining to stop sending an SR based on a remaining duration of a timer when a specific target is an MAC CE according to an embodiment of the present disclosure.
Figure 4B:
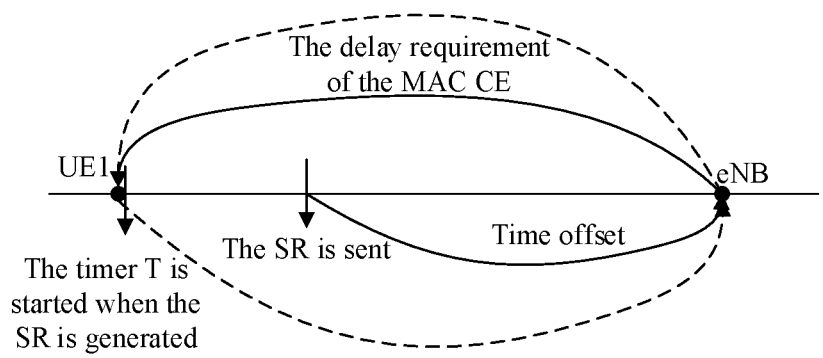
FIG. 4B shows a timeline illustrating stopping sending an SR generated by an MAC CE according to an embodiment of the present disclosure.

When the specific target is an MAC CE, reference is made to the flowchart diagram of FIG. 4A and the timeline diagram of FIG. 4B for illustration.

S401: the duration of the timer T is set according to the delay requirement of the MAC CE, the timer T is started when the MAC CE generates the SR, and a set time offset (denoted as delta T) is obtained.

S402: the remaining duration T' of the timer T is calculated.

S403: whether T' is equal to delta T is determined, and if yes, step 404 is performed.

S404: whether the SR has been sent is determined, and, if yes, step 405 is performed; otherwise, step 406 is performed.

S405: the process of determining whether the duration of receiving the SL resource allocated by a network side satisfies the delay requirement of the MAC CE is ended.

S406: SR sending is stopped.

The delay requirement of the MAC CE in FIG. 4B indicates the maximum duration for the UE1 to acquire the schedule resource information, the time offset delta T indicates the duration from sending the SR to determining the SL resource allocated by the network side, and the timer is started when the SR is generated.

Manner B: if the SR is not sent when the duration of the time counter is equal to a time difference between the delay requirement of the specific target and the time offset, then it is determined that the delay requirement of the specific target is not met. The starting time of the time counter is the time when it is determined that resource scheduling for the information of the specific target needs to be requested from the network side.

The delay requirement of the specific target indicates the maximum duration for the UE1 to acquire the schedule resource information, and the time offset indicates the duration from sending the SR to determining an SL resource allocated by a network side. The time difference obtained by subtracting the time offset from the delay requirement of the specific target indicates the maximum duration for the SR to wait for the resource carrying itself. The duration of the time counter is a duration during which the time counter counts to the delay requirement of the specific target, so when the duration of the time counter is equal to a time difference between the delay requirement of the specific target and the time offset, the SR is still not sent, which means that when the SR is then sent to the network side, there may be a case where the duration of receiving the SL resource allocated by the network side has exceeded the delay requirement of the specific target.

Figure 5A:
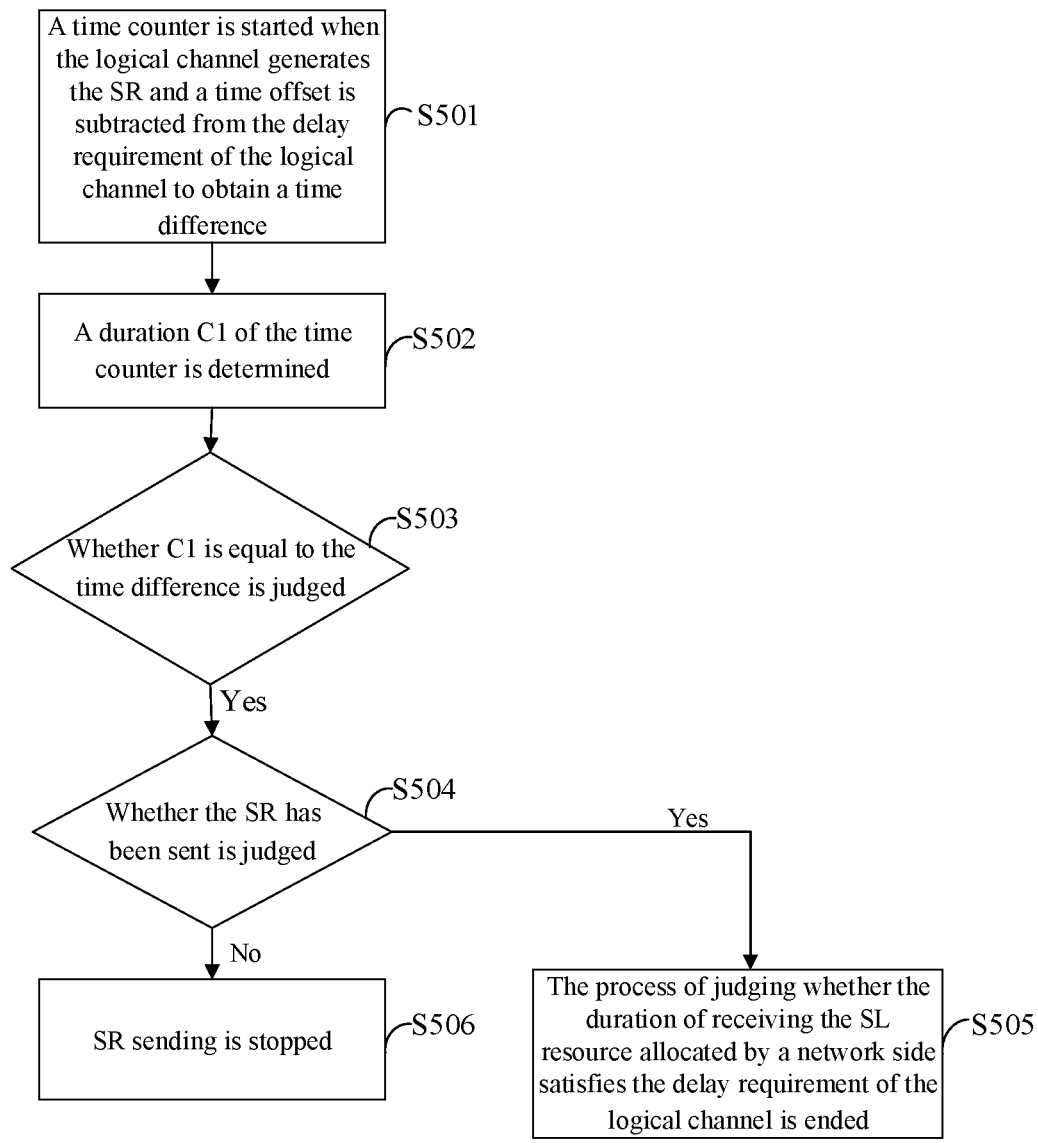
FIG. 5A shows a flowchart illustrating determining to stop sending an SR based on a duration of a time counter when a specific target is a logical channel according to an embodiment of the present disclosure.
Figure 5B:
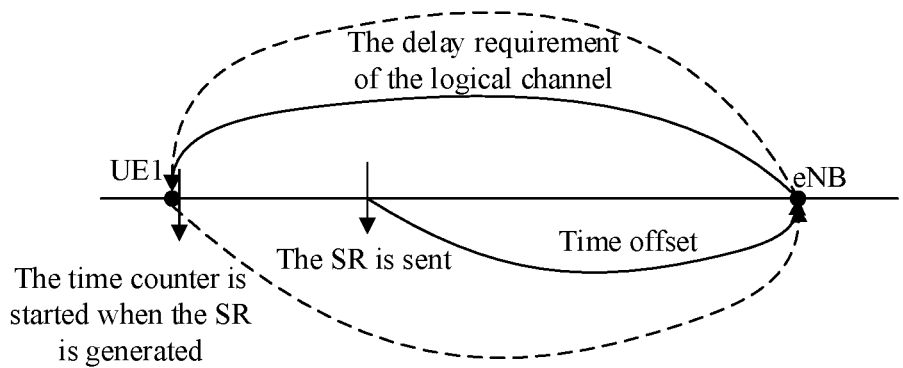
FIG. 5B shows a timeline illustrating stopping sending an SR generated by a logical channel according to an embodiment of the present disclosure.

In particular, when the specific target is a logical channel, reference is made to the flowchart diagram of FIG. 5A and the timeline diagram of FIG. 5B for illustration.

S501: a time counter is started when the logical channel generates the SR, and a time offset is subtracted from the delay requirement of the logical channel to obtain a time difference.

S502: a duration C1 of the time counter is determined.

S503: whether C1 is equal to the time difference is determined, and if yes, step 504 is performed.

S504: whether the SR has been sent is determined, and if yes, step 505 is performed; otherwise, step 506 is performed.

S505: the process of determining whether the duration of receiving the SL resource allocated by a network side satisfies the delay requirement of the logical channel is ended.

S506: SR sending is stopped.

The delay requirement of the logical channel in FIG. 5B indicates the maximum duration for the UE1 to acquire the schedule resource information, the time offset delta T indicates the duration from sending the SR to determining the SL resource allocated by the network side, and the time counter is started when the SR is generated.

Figure 6A:
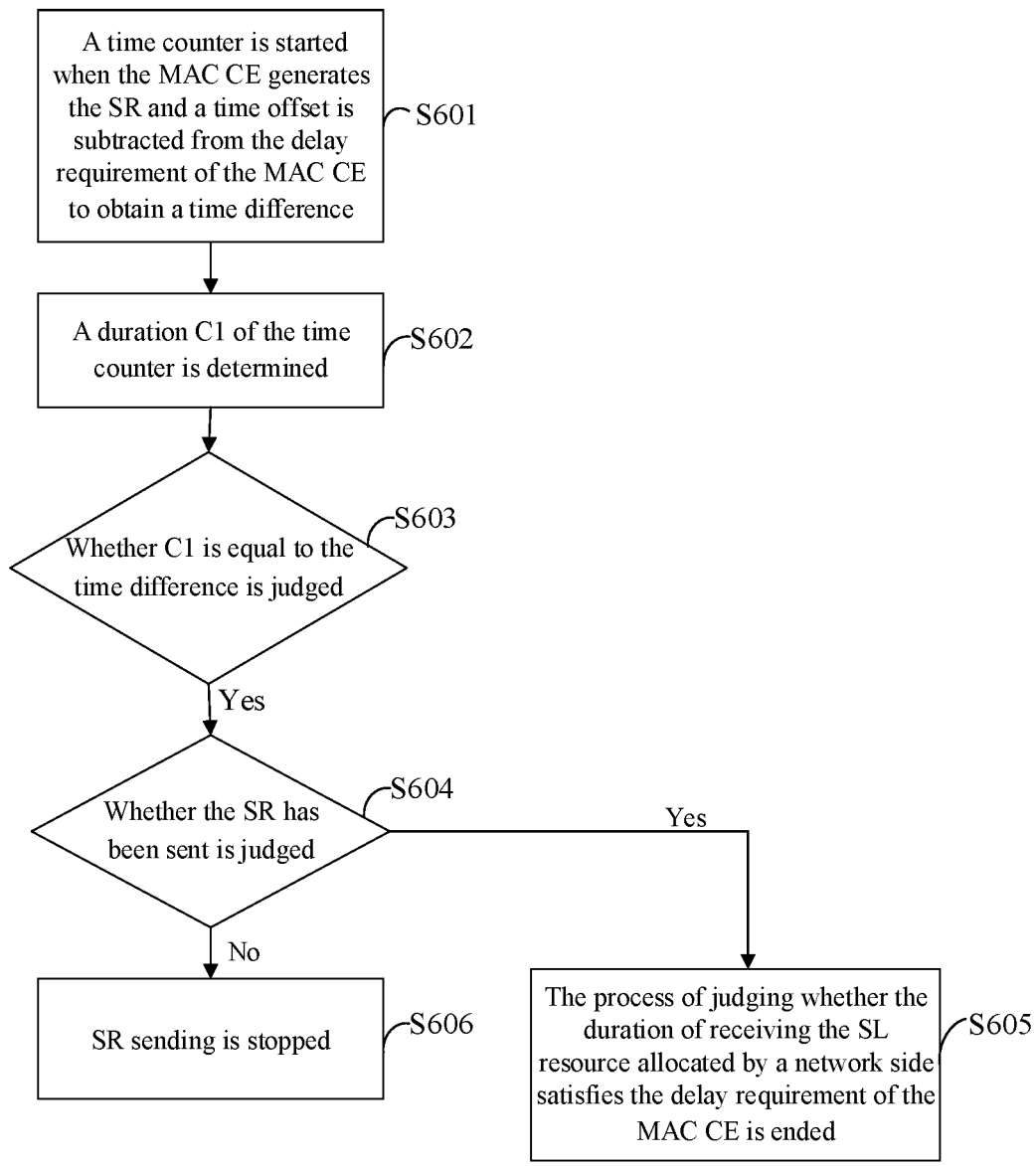
FIG. 6A shows a flowchart illustrating determining to stop sending an SR based on a duration of a time counter when a specific target is an MAC CE according to an embodiment of the present disclosure.
Figure 6B:
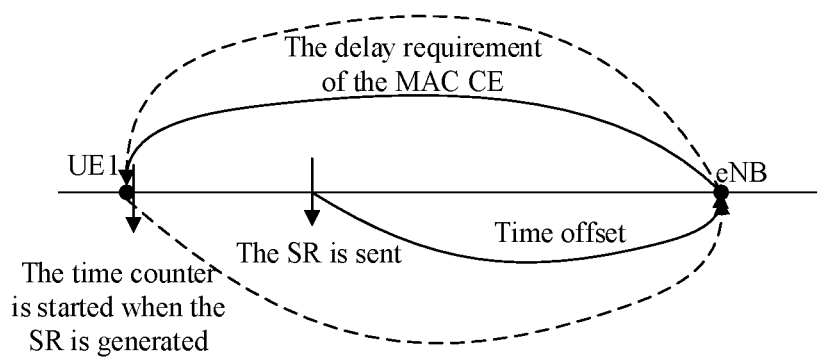
FIG. 6B shows a timeline illustrating stopping sending an SR generated by an MAC CE according to an embodiment of the present disclosure.

When the specific target is an MAC CE, reference is made to the flowchart diagram of FIG. 6A and the timeline diagram of FIG. 6B for illustration.

S601: a time counter is started when the MAC CE generates the SR, and a time offset is subtracted from the delay requirement of the MAC CE to obtain a time difference.

S602: a duration C1 of the time counter is determined.

S603: whether C1 is equal to the time difference is determined, and if yes, step 604 is performed.

S604: whether the SR has been sent is determined, and if yes, step 605 is performed; otherwise, step 606 is performed.

S605: the process of determining whether the duration of receiving the SL resource allocated by a network side satisfies the delay requirement of the MAC CE is ended.

S606: SR sending is stopped.

The delay requirement of the MAC CE in FIG. 6B indicates the maximum duration for the UE1 to acquire the schedule resource information, the time offset delta T indicates the duration from sending the SR to determining the SL resource allocated by the network side, and the time counter is started when the SR is generated.

Manner C: if the SR is not sent when it is determined that a time difference, between a current time when resource scheduling for the information of the specific target is requested from the network side and a trigger time when resource scheduling for the information of the specific target is requested from the network side, is greater than the time difference between the delay requirement of the specific target and the time offset, then it is determined that the delay requirement of the specific target is not met.

The time difference obtained by subtracting the trigger time from the current time when resource scheduling for the information of the specific target is requested from the network side indicates the duration for the SR to wait for the resource carrying itself. The time difference obtained by subtracting the time offset from the delay requirement of the specific target indicates the maximum duration for the SR to wait for the resource carrying itself. When a time difference, between the current time when resource scheduling for the information of the specific target is requested from the network side and the trigger time, is greater than the time difference between the delay requirement of the specific target and the time offset, the SR is still not sent, which means that when the SR is then sent to the network side, there may be a case where the duration of receiving the SL resource allocated by the network side has exceeded the delay requirement of the specific target.

Figure 7A:
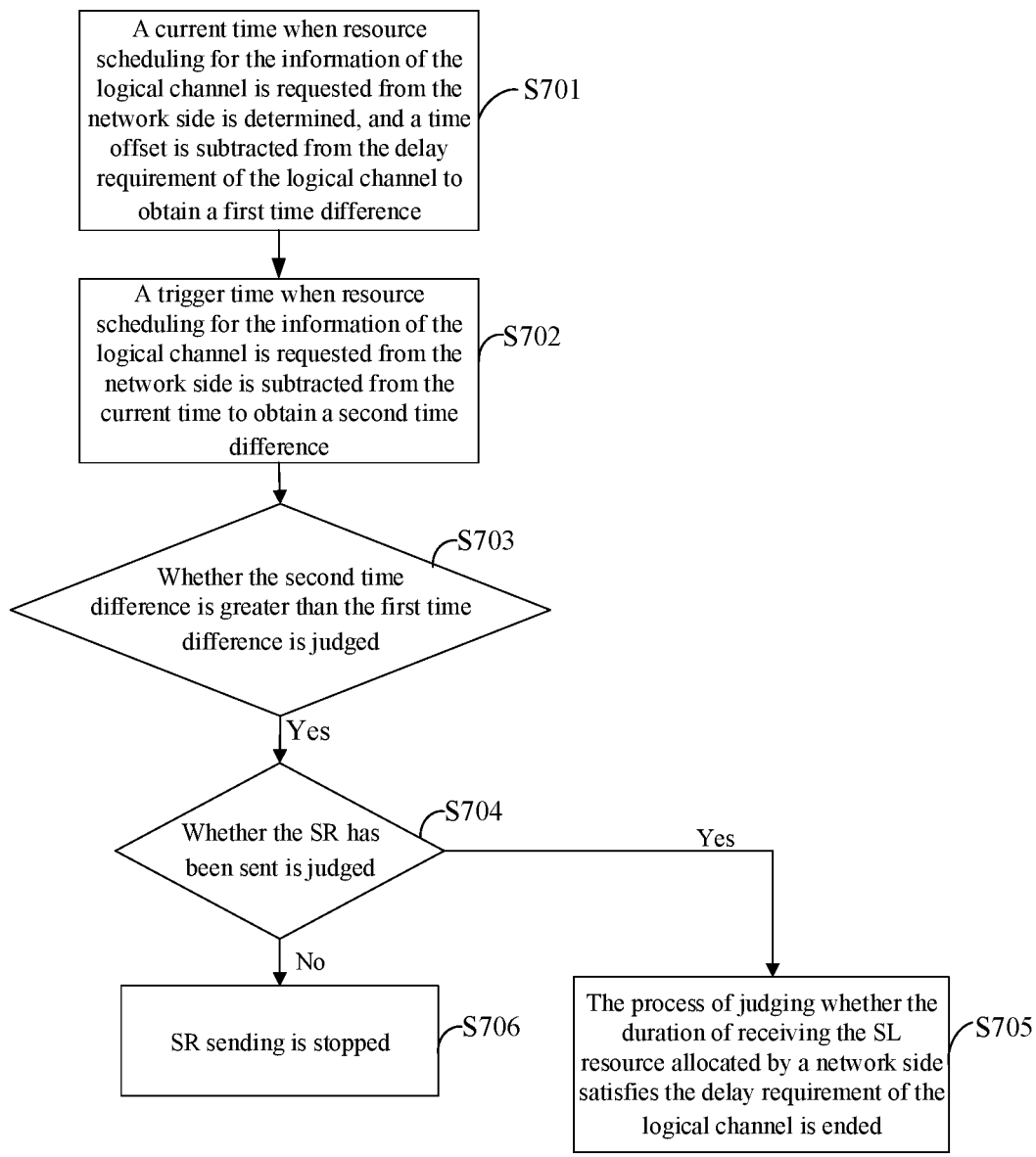
FIG. 7A shows a flowchart illustrating determining to stop sending an SR based on a time difference between a current time when resource scheduling for the information of a logical channel is requested from a network side and a trigger time when resource scheduling for the information of the logical channel is requested from the network side when the specific target is the logical channel according to an embodiment of the present disclosure.
Figure 7B:
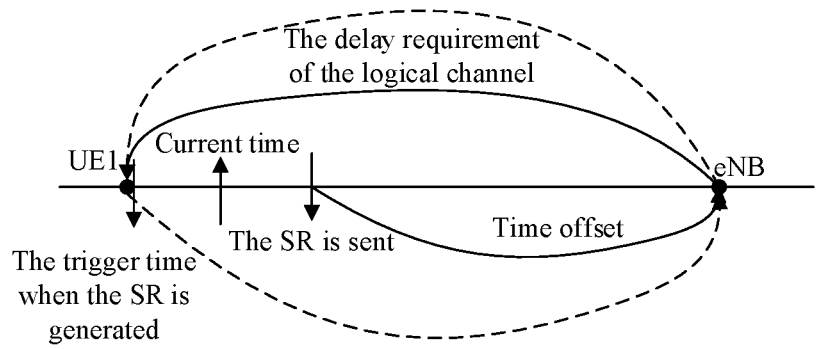
FIG. 7B shows a timeline illustrating stopping sending an SR generated by a logical channel according to an embodiment of the present disclosure.

In particular, when the specific target is a logical channel, reference is made to the flowchart diagram of FIG. 7A and the timeline diagram of FIG. 7B for illustration.

S701: a current time $t_{current}$ when resource scheduling for the information of the logical channel is requested from the network side is determined, and a time offset is subtracted from the delay requirement of the logical channel to obtain a first time difference.

S702: a trigger time $t_{trigger}$ when resource scheduling for the information of the logical channel is requested from the network side is subtracted from the $t_{current}$ to obtain a second time difference $t_{difference}$.

S703: whether the $t_{difference}$ is greater than the first time difference is determined, and if yes, step 704 is performed.

S704: whether the SR has been sent is determined, and if yes, step 705 is performed; otherwise, step 706 is performed.

S705: the process of determining whether the duration of receiving the SL resource allocated by a network side satisfies the delay requirement of the logical channel is ended.

S706: SR sending is stopped.

The delay requirement of the logical channel in FIG. 7B indicates the maximum duration for the UE1 to acquire the schedule resource information, the time offset delta T indicates the duration from sending the SR to determining an SL resource allocated by a network side, and the trigger time when the SR is generated and the current time when the SR is prepared to be sent to the network side are determined.

Figure 8A:
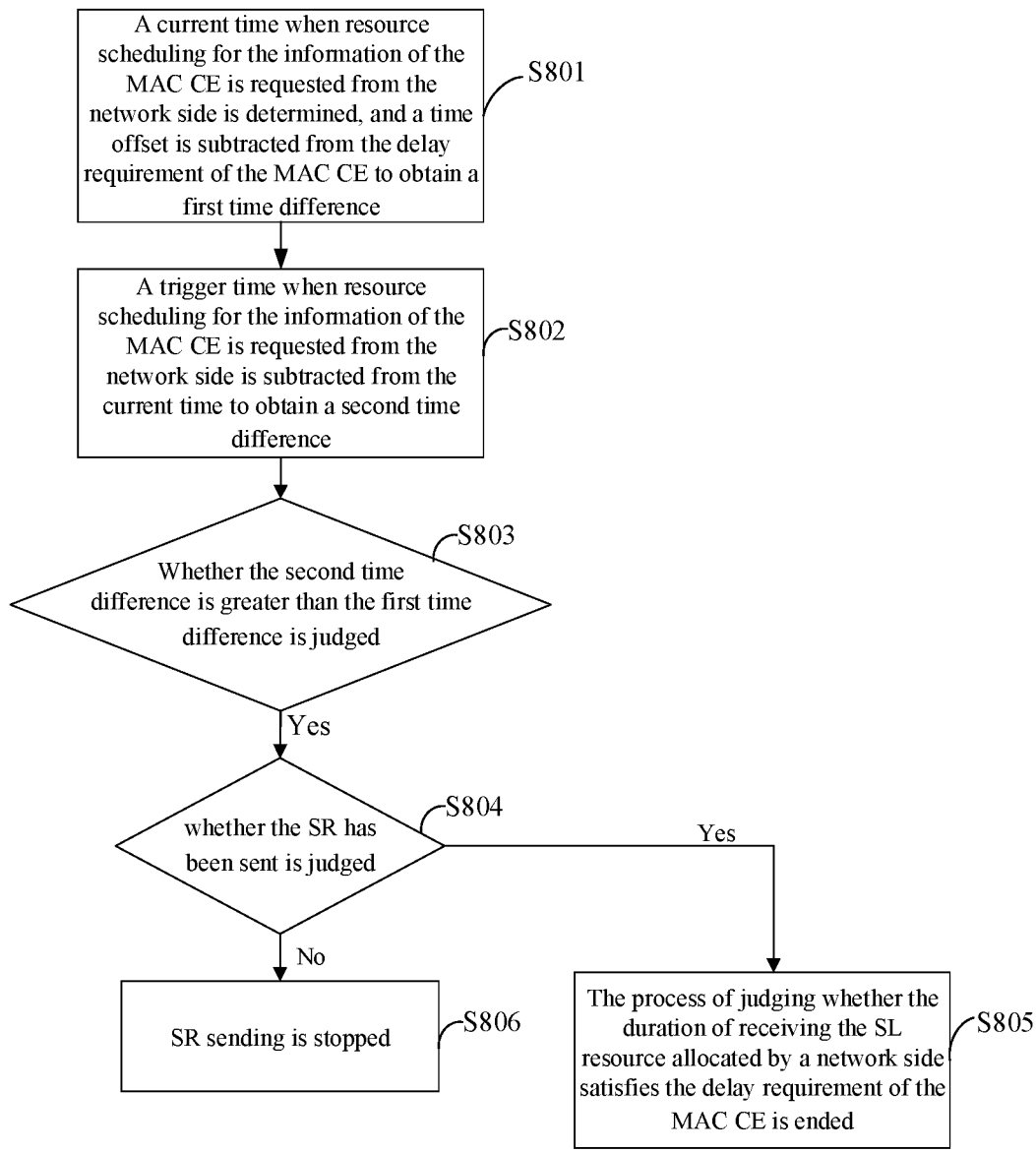
FIG. 8A shows a flowchart illustrating determining to stop sending an SR based on a time difference between a current time when resource scheduling for the information of an MAC CE is requested from a network side and a trigger time when resource scheduling for the information of the MAC CE is requested from the network side when the specific target is the MAC CE according to an embodiment of the present disclosure.
Figure 8B:
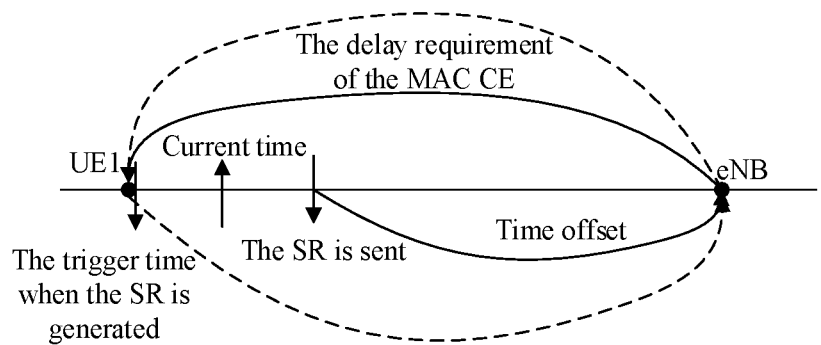
FIG. 8B shows a timeline illustrating stopping sending an SR generated by an MAC CE according to an embodiment of the present disclosure.

When the specific target is an MAC CE, reference is made to the flowchart diagram of FIG. 8A and the timeline diagram of FIG. 8B for illustration.

S801: a current time $t_{current}$ when resource scheduling for the information of the MAC CE is requested from the network side is determined, and a time offset is subtracted from the delay requirement of the MAC CE to obtain a first time difference.

S802: a trigger time $t_{trigger}$ when resource scheduling for the information of the MAC CE is requested from the network side is subtracted from the $t_{current}$ to obtain a second time difference $t_{difference}$.

S803: whether the $t_{difference}$ is greater than the first time difference is determined, and if yes, step 804 is performed.

S804: whether the SR has been sent is determined, and if yes, step 805 is performed; otherwise, step 806 is performed.

S805: the process of determining whether the duration of receiving the SL resource allocated by a network side satisfies the delay requirement of the MAC CE is ended.

S806: SR sending is stopped.

The delay requirement of the MAC CE in FIG. 8B indicates the maximum duration for the UE1 to acquire the schedule resource information, the time offset delta T indicates the duration from sending the SR to determining an SL resource allocated by a network side, and the trigger time when the SR is generated and the current time when the SR is prepared to be sent to the network side are determined.

Second rule: it is determined that the delay requirement of the specific target is not met, if the SR is not sent when it is determined that a time difference, between a current time when resource scheduling for the information of the specific target is requested from the network side and a trigger time when resource scheduling for the information of the specific target is requested from the network side, is greater than the delay requirement of the specific target.

The time difference obtained by subtracting the trigger time from the current time when resource scheduling for the information of the specific target is requested from the network side indicates the duration for the SR to wait for the resource carrying itself. The delay requirement of the specific target indicates the maximum duration for the UE1 to obtain the schedule resource information. When a time difference is greater than the delay requirement of the specific target and the time offset, the SR is still not sent, which means that when the SR is then sent to the network side, there may be a case where the duration of receiving the SL resource allocated by the network side has exceeded the delay requirement of the specific target.

Figure 9A:
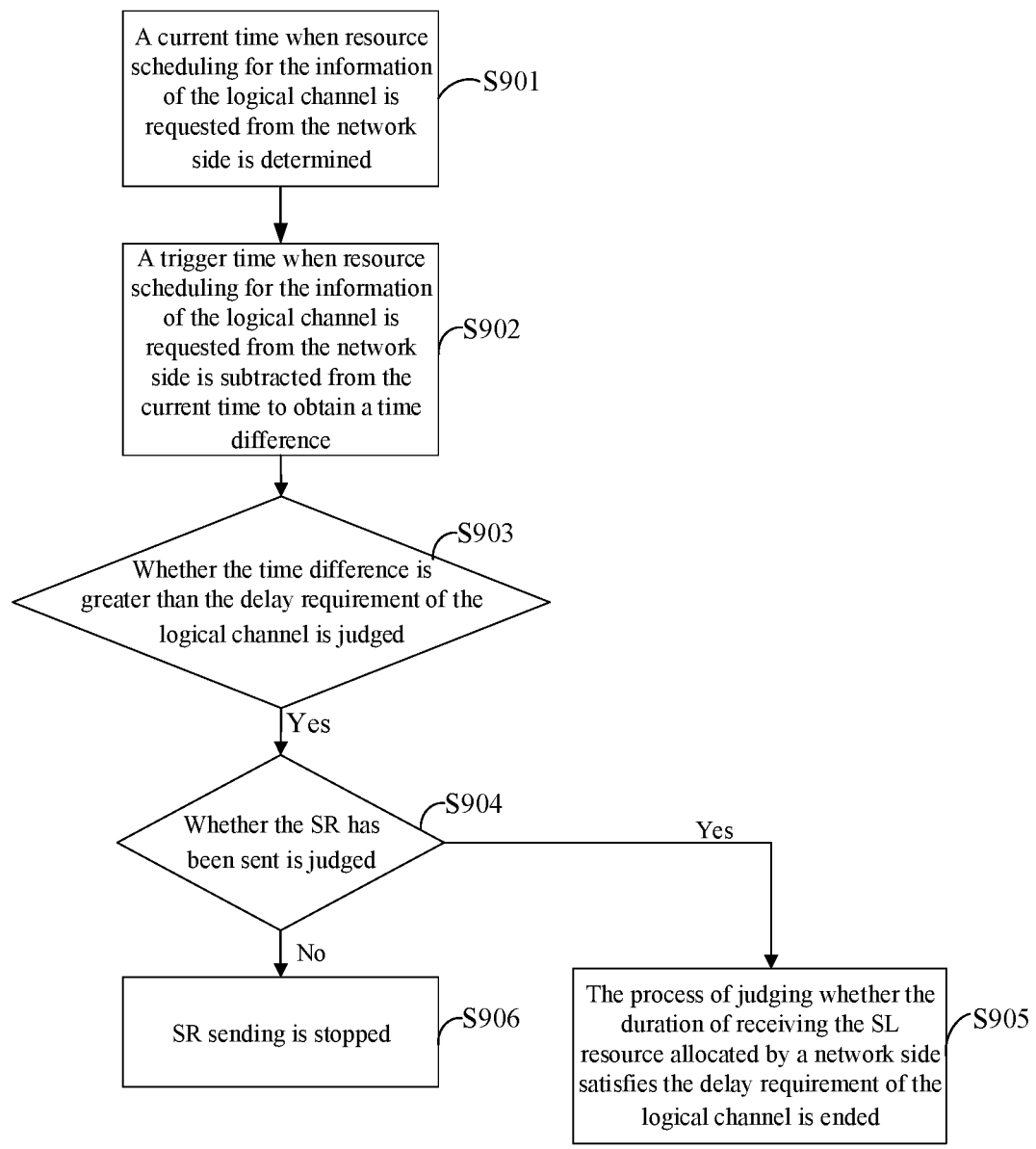
FIG. 9A shows a flowchart illustrating determining to stop sending an SR based on a time difference between a current time when resource scheduling for the information of a logical channel is requested from a network side and a trigger time when resource scheduling for the information of the logical channel is requested from the network side when the specific target is the logical channel according to an embodiment of the present disclosure.
Figure 9B:
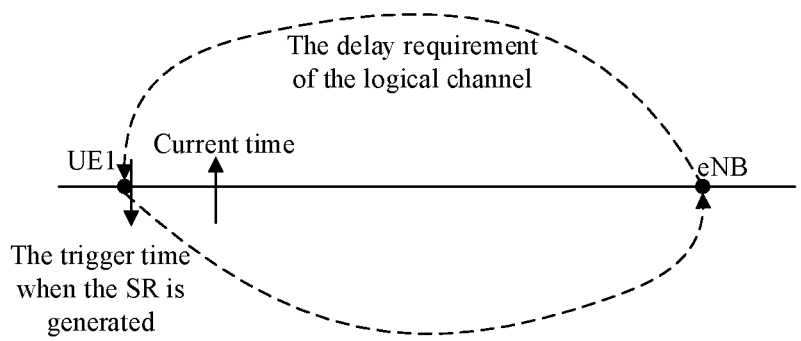
FIG. 9B shows a timeline illustrating stopping sending an SR generated by a logical channel according to an embodiment of the present disclosure.

In particular, when the specific target is a logical channel, reference is made to the flowchart diagram of FIG. 9A and the timeline diagram of FIG. 9B for illustration.

S901: a current time $t_{current}$ when resource scheduling for the information of the logical channel is requested from the network side is determined.

S902: a trigger time $t_{trigger}$ when resource scheduling for the information of the logical channel is requested from the network side is subtracted from the $t_{current}$ to obtain a time difference $t_{difference}$.

S903: whether the $t_{difference}$ is greater than the delay requirement of the logical channel is determined, and if yes, step 904 is performed.

S904: whether the SR has been sent is determined, and if yes, step 905 is performed; otherwise, step 906 is performed.

S905: the process of determining whether the duration of receiving the SL resource allocated by a network side satisfies the delay requirement of the logical channel is ended.

S906: SR sending is stopped.

The delay requirement of the logical channel in FIG. 9B indicates the maximum duration for the UE1 to acquire the schedule resource information, and the trigger time when the SR is generated and the current time when the SR is prepared to be sent to the network side are determined.

Figure 10A:
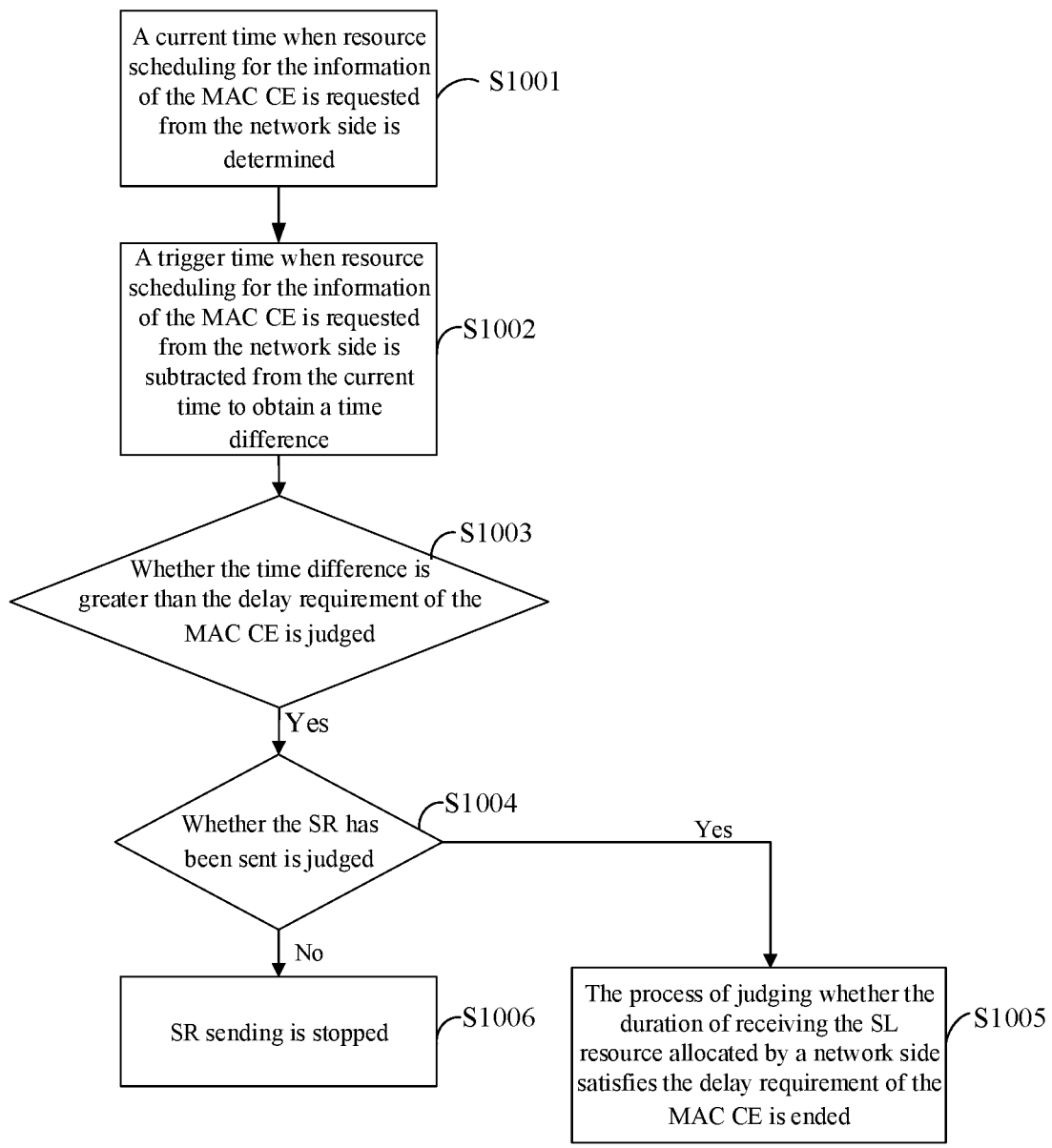
FIG. 10A shows a flowchart illustrating determining to stop sending an SR based on a time difference between a current time when resource scheduling for the information of an MAC CE is requested from a network side and a trigger time when resource scheduling for the information of the MAC CE is requested from the network side when the specific target is the MAC CE according to an embodiment of the present disclosure.
Figure 10B:
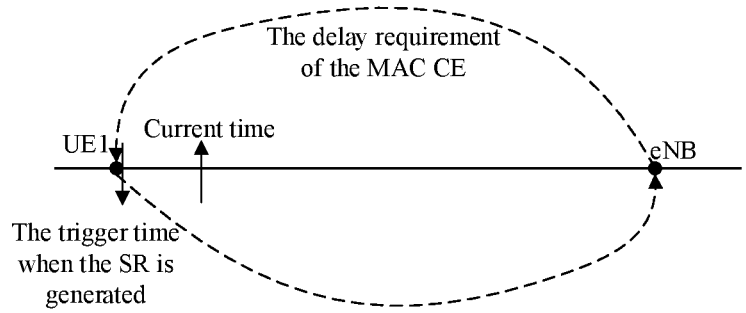
FIG. 10B shows a timeline illustrating stopping sending an SR generated by an MAC CE according to an embodiment of the present disclosure.

When the specific target is an MAC CE, reference is made to the flowchart diagram of FIG. 10A and the timeline diagram of FIG. 10B for illustration.

S1001: a current time $t_{current}$ when resource scheduling for the information of the MAC CE is requested from the network side is determined.

S1002: a trigger time $t_{trigger}$ when resource scheduling for the information of the MAC CE is requested from the network side is subtracted from the $t_{current}$ to obtain a time difference $t_{difference}$.

S1003: whether the $t_{difference}$ is greater than the delay requirement of the MAC CE is determined, and if yes, step 1004 is performed.

S1004: whether the SR has been sent is determined, and if yes, step 1005 is performed; otherwise, step 1006 is performed.

S1005: the process of determining whether the duration of receiving the SL resource allocated by a network side satisfies the delay requirement of the MAC CE is ended.

S1006: SR sending is stopped.

The delay requirement of the MAC CE in FIG. 10B indicates the maximum duration for the UE1 to acquire the schedule resource information, the time offset delta T indicates the duration from sending the SR to determining an SL resource allocated by a network side, and the trigger time when the SR is generated and the current time when the SR is prepared to be sent to the network side are determined.

In one embodiment, after determining that the delay requirement of the specific target is not met, and before stopping sending the SR, further, resource for the information of the specific target can be randomly requested from the network side. Before sending a Random Access Schedule Request (RA-SR) to the network side, when it is determined that the RA-SR fails to meet the delay requirement of the specific target, RA-SR sending is stopped.

Figure 11:
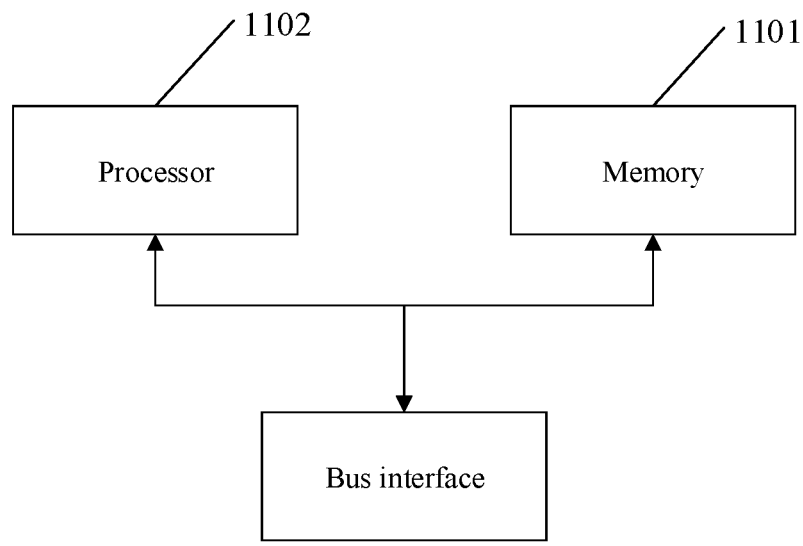
FIG. 11 shows a structural diagram of a user terminal according to an embodiment of the present disclosure.

Embodiments of the present application provide a user terminal, see FIG. 11, including at least a memory 1101 and at least one processor 1102, where the memory 1101 and the processor 1102 are in communication with each other via a communication bus; the memory 1101 is configured to store program instructions; and the processor 1102 is configured to call the program instructions stored in the memory, and execute according to an obtained program: in response to a demand for requesting from a network side resource scheduling for information of a specific target, determining a delay requirement of the specific target; and before an SR is sent to the network side, when it is determined that the delay requirement of the specific target is not met, stopping sending the SR.

In one embodiment, the processor 1102 is configured to execute: when the specific target is a logical channel, determining a delay requirement from a QoS parameter corresponding to the logical channel; or, when the specific target is an MAC CE, determining a delay requirement of the MAC CE.

In one embodiment, the processor 1102 is configured to determine the delay requirement of the MAC CE via protocol or network side configuration.

In one embodiment, the processor 1102 is configured to determine, based on a set time offset, whether the delay requirement of the specific target is met; where the time offset is a duration from sending the SR to determining an SL resource allocated by a network side.

In one embodiment, the processor 1102 is further configured to: determine the time offset via protocol or network side configuration.

In one embodiment, the processor 1102 is configured to determine that the delay requirement of the specific target is not met in response to the SR being not sent when a remaining duration of a timer is equal to the time offset; where the duration of the timer is set according to the delay requirement and a starting time of the timer is the time when it is determined that resource scheduling for the information of the specific target needs to be requested from the network side.

In one embodiment, the processor 1102 is configured to determine that the delay requirement of the specific target is not met in response to the SR being not sent when a duration of a time counter is equal to a time difference between the delay requirement of the specific target and the time offset.

In one embodiment, the processor 1102 is configured to determine that the delay requirement of the specific target is not met in response to the SR being not sent when it is determined that a time difference, between a current time when resource scheduling for the information of the specific target is requested from the network side and a trigger time when resource scheduling for the information of the specific target is requested from the network side, is greater than the time difference between the delay requirement of the specific target and the time offset.

In one embodiment, the processor 1102 is configured to determine that the delay requirement of the specific target is not met in response to the SR being not sent when it is determined that a time difference, between a current time when resource scheduling for the information of the specific target is requested from the network side and a trigger time when resource scheduling for the information of the specific target is requested from the network side, is greater than the delay requirement of the specific target.

In one embodiment, after determining that the delay requirement of the specific target is not met, and before stopping sending the SR, the processor 1102 is further configured to: randomly request resource scheduling for the information of the specific target from the network side.

Figure 12:
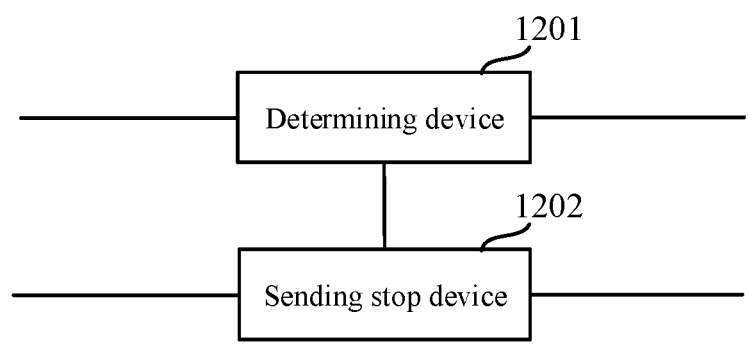
FIG. 12 shows a structural diagram of a device for stopping sending a schedule request according to an embodiment of the present disclosure.

Embodiments of the present application also provide a device for stopping sending a schedule request, see FIG. 12, including at least a determining device 1201 and a sending stop device 1202. The determining device 1201 is configured to determine a delay requirement of the specific target, in response to a demand for requesting from a network side resource scheduling for information of a specific target; and the sending stop device 1202 is configured to stop sending the SR, when it is determined that the delay requirement of the specific target is not met before the SR is sent to the network side.

In one embodiment, the determining device 1201 is configured to: when the specific target is a logical channel, determine a delay requirement from a QoS parameter corresponding to the logical channel; or, when the specific target is an MAC CE, determine a delay requirement of the MAC CE.

In one embodiment, the determining device 1201 is configured to determine the delay requirement of the MAC CE via protocol or network side configuration.

In one embodiment, the sending stop device 1202 is configured to: determining, based on a set time offset, whether the delay requirement of the specific target is met; where the time offset is a duration from sending the SR to determining an SL resource allocated by a network side.

In one embodiment, the sending stop device 1202 is further configured to: determine the time offset via protocol or network side configuration.

In one embodiment, the sending stop device 1202 is configured to: determine that the delay requirement of the specific target is not met in response to the SR being not sent when a remaining duration of a timer is equal to the time offset; where the duration of the timer is set according to the delay requirement, and a starting time of the timer is the time when it is determined that resource scheduling for the information of the specific target needs to be requested from the network side.

In one embodiment, the sending stop device 1202 is configured to: determine that the delay requirement of the specific target is not met in response to the SR being not sent when a duration of a time counter is equal to a time difference between the delay requirement of the specific target and the time offset.

In one embodiment, the sending stop device 1202 is configured to: determine that the delay requirement of the specific target is not met in response to the SR being not sent when it is determined that a time difference, between a current time when resource scheduling for the information of the specific target is requested from the network side and a trigger time when resource scheduling for the information of the specific target is requested from the network side, is greater than the time difference between the delay requirement of the specific target and the time offset.

In one embodiment, the sending stop device 1202 is configured to: determine that the delay requirement of the specific target is not met in response to the SR being not sent when it is determined that a time difference, between a current time when resource scheduling for the information of the specific target is requested from the network side and a trigger time when resource scheduling for the information of the specific target is requested from the network side, is greater than the delay requirement of the specific target.

In one embodiment, after determining that the delay requirement of the specific target is not met, and before stopping sending the SR, the sending stop device 1202 is further configured to: randomly request resource scheduling for the information of the specific target from the network side.

Embodiments of the present application provide a storage medium including at least computer-readable instructions which, when read and executed by a computer, cause the computer to perform the aforementioned method for stopping sending the schedule request.

In summary, in response to a demand for requesting from a network side resource scheduling for information of a specific target, a delay requirement of the specific target is determined; and before an SR is sent to the network side, when it is determined that the delay requirement of the specific target is not met, SR sending is stopped. In this way, before an SR is sent to a network side, when it is determined that a delay requirement of a specific target is not met, sending of the SR is stopped in advance, and the acquisition timeout of schedule resource information sent by the network side can be avoided.

The program products may employ any combination of one or more readable media. The readable medium may be a readable signal medium or a readable storage medium. The readable storage medium may be, for example, but not limited to, an electronic, magnetic, optical, electromagnetic, infrared, or semiconductor system, device, or apparatus, or any combination of the foregoing. More specific examples (a non-exhaustive list) of readable storage media include: an electrical connection having one or more wires, a portable disc, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

The program product for service control according to the embodiments of the present application may employ the portable CD-ROM and include program code, and may be run on a computing device. However, the program product of the present application is not limited to this, and in this document, the readable storage medium may be any tangible medium that contains or stores a program for use by or in combination with a command execution system, device, or apparatus.

The readable signal medium may include a data signal that is propagated in the baseband or as part of a carrier wave, in which the readable program code is carried. This propagated data signal may take many forms, including but not limited to an electromagnetic signal, an optical signal, or any suitable combination of the above. The readable signal medium may also be any readable medium other than a readable storage medium that may send, propagate, or transmit a program for use by or in combination with a command execution system, device, or apparatus.

The program code contained on the readable medium may be transmitted by any suitable medium, including but not limited to a wireless, wired, optical cable, or RF medium, or any suitable combination thereof.

The program code for carrying out operations of the present application may be written in any combination of one or more programming languages, including an object-oriented programming language such as Java, C++ or the like and conventional procedural programming languages, such as the "C" programming language or similar programming languages. The program code may execute entirely on the user computing device, or partly on the user apparatus, and as a stand-alone software package, partly on the user computing device, partly on a remote computing device or entirely on the remote computing device or server. In the scenario involving the remote computing device, the remote computing device may be connected to the user computing device through any type of network, including a local area network (LAN) or a wide area network (WAN), or the connection may be made to an external computing device (for example, through the Internet using an Internet Service Provider).

What is claimed is:

1. A method for stopping sending a Schedule Request (SR), comprising:
   determining a delay requirement of a specific target, in response to a demand for requesting from a network side resource scheduling for information of a specific target; and
   stopping sending the SR, when it is determined that the delay requirement of the specific target is not met before the SR is sent to the network side;
   wherein whether the delay requirement of the specific target is met is determined by:
   determining, based on a set time offset, whether the delay requirement of the specific target is met; wherein the time offset is a duration from sending the SR to determining a Sidelink (SL) resource allocated by the network side;
   or,
   determining that the delay requirement of the specific target is not met in response to the SR being not sent when it is determined that a time difference, between a current time when resource scheduling for the information of the specific target is requested from the network side and a trigger time when resource scheduling for the information of the specific target is requested from the network side, is greater than the delay requirement of the specific target.

2. The method according to claim 1, wherein the determining the delay requirement of the specific target comprises:
   when the specific target is a logical channel, determining the delay requirement from a Quality of Service (QOS) parameter corresponding to the logical channel; or,
   when the specific target is a Media Access Control Control Element (MAC CE), determining the delay requirement of the MAC CE.

3. The method according to claim 2, wherein the delay requirement of the MAC CE is pre-defined or pre-configured by the network side.

4. The method according to claim 1, further comprising:
   determining the time offset via protocol or network side configuration.

5. The method according to claim 1, wherein the determining, based on the set time offset, whether the delay requirement of the specific target is met comprises:
   determining that the delay requirement of the specific target is not met in response to the SR being not sent when a remaining duration of a timer is equal to the time offset;
   wherein a duration of the timer is a duration during which the timer counts down from the delay requirement of the specific target and a starting time of the timer is time when it is determined that resource scheduling for the information of the specific target needs to be requested from the network side.

6. The method according to claim 1, wherein the determining, based on the set time offset, whether the delay requirement of the specific target is met comprises:
   determining that the delay requirement of the specific target is not met in response to the SR being not sent when a duration of a time counter is equal to a time difference between the delay requirement of the specific target and the time offset;
   wherein the duration of the time counter is a duration during which the time counter counts to the delay requirement of the specific target and a starting time of the time counter is time when it is determined that resource scheduling for the information of the specific target needs to be requested from the network side.

7. The method according to claim 1, wherein the determining, based on the set time offset, whether the delay requirement of the specific target is met comprises:
   determining that the delay requirement of the specific target is not met in response to the SR being not sent when it is determined that a time difference, between a current time when resource scheduling for the information of the specific target is requested from the network side and a trigger time when resource scheduling for the information of the specific target is requested from the network side, is greater than a time difference between the delay requirement of the specific target and the time offset.

8. The method according to claim 1, after determining that the delay requirement of the specific target is not met, and before stopping sending the SR, the method further comprises:
   randomly requesting resource scheduling for the information of the specific target from the network side.

9. A user terminal, comprising:
   a memory, configured to store program instructions; and
   a processor, configured to call the program instructions stored in the memory, and execute according to an obtained program:
   determining a delay requirement of a specific target, in response to a demand for requesting from a network side resource scheduling for information of a specific target; and
   stopping sending a Schedule Request (SR), when it is determined that the delay requirement of the specific target is not met before the SR is sent to the network side;
   wherein the processor is configured to execute:
   determining, based on a set time offset, whether the delay requirement of the specific target is met; wherein the time offset is a duration from sending the SR to determining a Sidelink (SL) resource allocated by the network side;
   or,
   determining that the delay requirement of the specific target is not met in response to the SR being not sent when it is determined that a time difference, between a current time when resource scheduling for the information of the specific target is requested from the network side and a trigger time when resource scheduling for the information of the specific target is requested from the network side, is greater than the delay requirement of the specific target.

10. The user terminal according to claim 9, wherein the processor is configured to execute:

when the specific target is a logical channel, determining the delay requirement from a Quality of Service (QOS) parameter corresponding to the logical channel; or, when the specific target is a Media Access Control Control Element (MAC CE), determining the delay requirement of the MAC CE.

11. The user terminal according to claim 10, wherein the delay requirement of the MAC CE is pre-defined or pre-configured by the network side.

12. The user terminal according to claim 9, wherein the processor is further configured to execute:

determining the time offset via protocol or network side configuration.

13. The user terminal according to claim 9, wherein the processor is further configured to execute:

determining that the delay requirement of the specific target is not met in response to the SR being not sent when a remaining duration of a timer is equal to the time offset;

wherein a duration of the timer is a duration during which the timer counts down from the delay requirement of the specific target and a starting time of the timer is time when it is determined that resource scheduling for the information of the specific target needs to be requested from the network side.

14. The user terminal according to claim 9, wherein the processor is further configured to execute:

determining that the delay requirement of the specific target is not met in response to the SR being not sent when a duration of a time counter is equal to a time difference between the delay requirement of the specific target and the time offset;

wherein the duration of the time counter is a duration during which the time counter counts to the delay requirement of the specific target and a starting time of the time counter is time when it is determined that resource scheduling for the information of the specific target needs to be requested from the network side.

15. The user terminal according to claim 9, wherein the processor is further configured to execute:

determining that the delay requirement of the specific target is not met in response to the SR being not sent when it is determined that a time difference, between a current time when resource scheduling for the information of the specific target is requested from the network side and a trigger time when resource scheduling for the information of the specific target is requested from the network side, is greater than a time difference between the delay requirement of the specific target and the time offset.

16. The user terminal according to claim 9, wherein after determining that the delay requirement of the specific target is not met, and before stopping sending the SR, the processor is further configured to execute:

randomly requesting resource scheduling for the information of the specific target from the network side.

* * * * *